(12) United States Patent
Kim (10) Patent No.: US 9,527,522 B2
(45) Date of Patent: Dec. 27, 2016

(54) CLEARANCE COMPENSATOR OF YOKE

(71) Applicant: HYUNDAI MOBIS CO., LTD., Seoul (KR)

(72) Inventor: Tae Yoon Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 4 days.

(21) Appl. No.: 14/465,716

(22) Filed: Aug. 21, 2014

(65) Prior Publication Data

US 2015/0053030 A1    Feb. 26, 2015

(30) Foreign Application Priority Data

Aug. 23, 2013    (KR) .................. 10-2013-0100657

(51) Int. Cl.
| | | |
|---|---|---|
| *F16H 55/18* | (2006.01) | |
| *F16H 35/00* | (2006.01) | |
| *B62D 3/12* | (2006.01) | |
| *F16H 19/04* | (2006.01) | |
| *F16H 57/12* | (2006.01) | |
| *F16H 55/28* | (2006.01) | |

(52) U.S. Cl.
CPC .............. *B62D 3/123* (2013.01); *F16H 19/04* (2013.01); *F16H 55/283* (2013.01); *F16H 57/12* (2013.01); *Y10T 74/19623* (2015.01)

(58) Field of Classification Search
CPC ........ B62D 3/123; F16H 19/04; F16H 55/283; F16H 57/12
See application file for complete search history.

(56) References Cited

U.S. PATENT DOCUMENTS

| | | | | |
|---|---|---|---|---|
| 5,746,285 | A * | 5/1998 | Yonezawa .............. | B62D 3/123 180/428 |
| 7,487,984 | B1* | 2/2009 | Lemont, Jr. ............ | B62D 3/123 280/93.514 |
| 7,930,951 | B2* | 4/2011 | Eickholt ................ | B62D 3/123 74/388 PS |
| 2008/0034911 | A1* | 2/2008 | Bieber ................... | B62D 3/123 74/422 |
| 2010/0018337 | A1* | 1/2010 | Kawakubo ............. | B62D 3/123 74/422 |

FOREIGN PATENT DOCUMENTS

KR      10-0562579 B1    3/2006

\* cited by examiner

*Primary Examiner* — William Kelleher
*Assistant Examiner* — Jake Cook
(74) *Attorney, Agent, or Firm* — Knobbe Martens Olson & Bear LLP (57) ABSTRACT

A clearance compensator for a yoke may include: a yoke body installed in a housing of a steering gear box so as to support a rack bar; an elastic member pressurizing the yoke body toward the rack bar; a pressurizing unit contacted with the elastic member so as to support the elastic member; and a yoke plug unit including a yoke plug fixed to the housing and a pressurization adjusting part adjusting the extent to which the pressurizing unit supports the elastic member, and inserted and coupled to the yoke plug.

8 Claims, 8 Drawing Sheets

CLEARANCE COMPENSATOR OF YOKE

CROSS-REFERENCES TO RELATED APPLICATIONS

The present application claims priority to Korean application number 10-2013-0100657, filed on Aug. 23, 2013, which is incorporated by reference in its entirety.

BACKGROUND

The present disclosure relates to a clearance compensator of a yoke, and more particularly, to a clearance compensator of a yoke, which is capable of reducing noise of a gear box and maintaining a steering feeling.

In general, a steering gear box having a rack-and-pinion mechanism employs a yoke system which supports a rack bar so as to remove a clearance between gears of the pinion and the rack bar, improves the operation stability of a vehicle, and reduces noise of the vehicle.

The related art of the present invention is disclosed in Korean Patent No. 10-0562579 published on Mar. 22, 2006 and entitled "Structure for protecting rattle noise of auto-steering system".

SUMMARY

An embodiment of the present invention is directed to a clearance compensator of a yoke, which is capable of compensating for a clearance between a yoke body and a yoke plug.

Another embodiment of the present invention is directed to a clearance compensator of a yoke, which is capable of preventing a mechanical impact sound, maintaining a sliding force of a steering gear box, and maintaining operation performance of a vehicle.

Another embodiment of the present invention is directed to a clearance compensator of a yoke, which is capable of setting a torsion value of a torsion spring to various values, and easily controlling the torsion value even after mounting.

In one embodiment, a clearance compensator for a yoke may include: a yoke body installed in a housing of a steering gear box so as to support a rack bar; an elastic member pressurizing the yoke body toward the rack bar; a pressurizing unit contacted with the elastic member so as to support the elastic member; and a yoke plug unit including a yoke plug fixed to the housing and a pressurization adjusting part adjusting the extent to which the pressurizing unit supports the elastic member, and inserted and coupled to the yoke plug.

The pressurizing unit may include: a pusher rotatably coupled to the yoke plug and contacted with the elastic member so as to support the elastic member; and a rotating elastic part having both end parts fixed to the pusher and the yoke plug unit, respectively, so as to rotatably and elastically support the pusher.

The pressurization adjusting part may include: an adjusting part body part inserted and coupled to the yoke plug; and a rotating elastic part fixing part protruding from the adjusting part body part toward the rack bar so as to fix the rotating elastic part.

The adjusting part body part may include: an adjusting part body rotatably inserted into the yoke plug; and an inserting coupling part positioned at the rear side of the adjusting part body, having a diameter which decreases toward the rack bar, and inserted and coupled to the yoke plug.

The pressurization adjusting part may further include a body fixing part for fixing the adjusting part body part to the yoke plug.

The body fixing part may be inserted into a body fixing part entry hole formed in the yoke plug, and pressurize the adjusting part body part to be fixed to the yoke plug.

The body fixing part may be formed of a metallic material, and have a pin shape.

The clearance compensator may further include a fixing unit received on the pusher through the yoke plug so as to maintain screw coupling between the pusher and the yoke plug.

One end part of the fixing unit may be received on the pusher through a fixing unit entry hole of the yoke plug, and the other end part of the fixing unit may be exposed to the outside of the yoke plug when the one end part of the fixing unit is received on the pusher.

The clearance compensator may further include a clearance adjusting unit including a cover part disposed between the yoke body and the elastic member and contacted with the yoke body and the elastic member, and a fastening part coupled to the pressurizing unit so as to pressurize the cover part toward the elastic member.

In accordance with the embodiment of the present invention, the clearance compensator of the yoke may include the pressurizing unit provided between the yoke body and the yoke plug, and the pressurizing unit may be screwed to the yoke plug so as to pressurize and support the yoke body. Thus, the contact between the yoke plug and the pressurizing unit may be maintained, and a clearance caused by movement of the yoke by may be compensated for.

Furthermore, since the pressurizing unit includes the pusher and a torsion spring, the pusher may continuously pressurize and support the yoke body through a rotational elastic force provided from the torsion spring.

Moreover, since the fixing unit is provided to maintain the screw coupling between the pressurizing unit and the yoke plug, the fixing unit may prevent the release of the screw coupling when the pressurizing unit and the yoke plug are assembled.

Furthermore, since the rotating elastic part is rotated through the pressurization adjusting part, it is possible to adjust the extent to which a clearance of the yoke is compensated for, through a simple operation without separating the device.

Moreover, since the adjusting part body part is inserted and coupled to the yoke plug, the adjusting part body part may be simply assembled without a complex assembly structure.

Furthermore, since the adjusting part body part coupled to the yoke plug is fixed to the yoke plug through the body fixing part, it is possible to prevent the adjusting part body part from coming off from the yoke plug.

DESCRIPTION OF EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
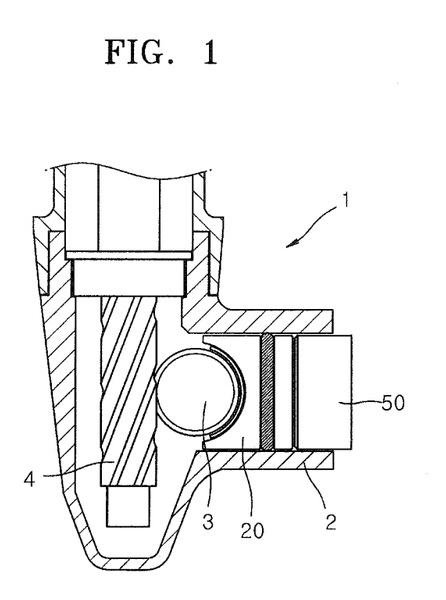
FIG. 1 is a cross-sectional view of a steering gear box of a vehicle.
Figure 2:
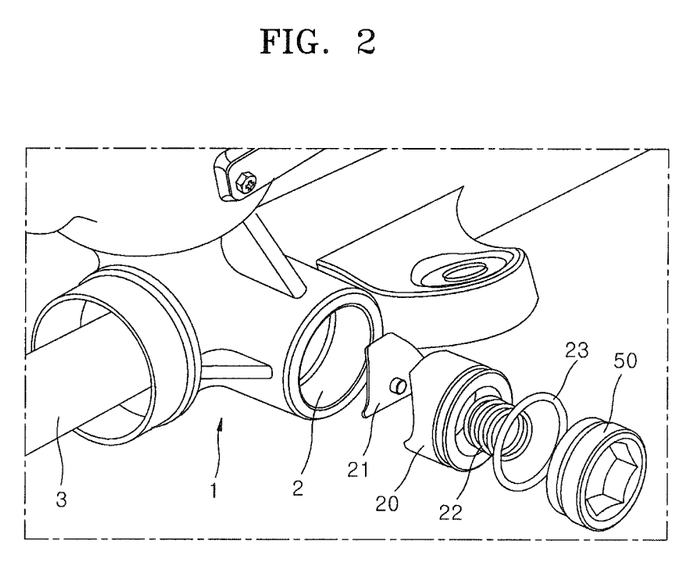
FIG. 2 is a cross-sectional view of a yoke device applied to the steering gear box.
Figure 3:
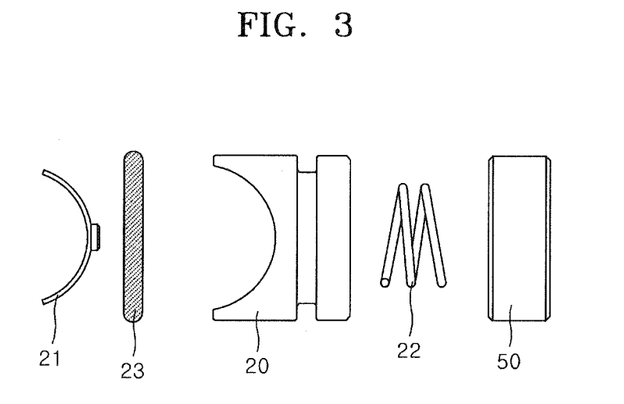
FIG. 3 is an exploded view of the yoke device.

FIG. 1 is a cross-sectional view of a typical steering gear box of a vehicle. FIG. 2 is a cross-sectional view of a yoke device applied to the steering gear box of FIG. 1. FIG. 3 is an exploded view of the yoke device.

Referring to FIGS. 1 to 3, the yoke device applied to the steering gear box 1 serves to adjust a clearance between the pinion 4 and the rack bar 3, because a clearance occurs in a structure where the pinion 4 and the rack bar 3 are engaged with each other through gears.

The yoke device has a structure in which a yoke slipper 21, a yoke body 20 having a yoke ring 23 coupled thereto, a yoke spring 22, and a yoke plug 50 are sequentially coupled to a housing 2 of the steering gear box 1 so as to support the rack bar 3.

With the use of the steering gear box, clearance between the yoke body and the yoke plug is increased by wear of the gears or the like. When the clearance between the yoke body and the yoke plug exceeds a predetermined range, an impact from the road may be transmitted to the yoke device. In this case, the yoke body and the yoke plug collide with each other, a mechanical impact sound is generated, and the operation performance of the vehicle may be degraded due to the reduction in sliding force of the steering gear box.

Figure 4:
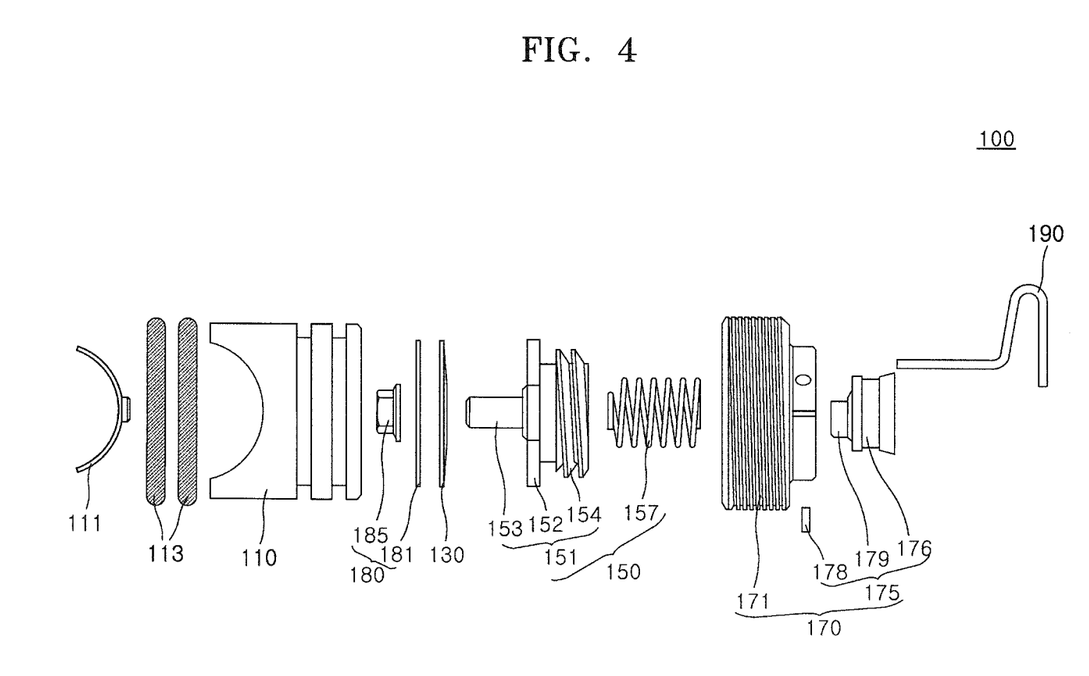
FIG. 4 is an exploded view of a clearance compensator of a yoke in accordance with an embodiment of the present invention.

FIG. 4 is an exploded view of a clearance compensator of a yoke in accordance with an embodiment of the present invention. Referring to FIGS. 1 to 4, the clearance compensator 100 of the yoke in accordance with the embodiment of the present invention may include a yoke body 110, an elastic member 130, a pressurizing unit 150, and a yoke plug unit 170.

The yoke body 110 may be installed in a housing 2 of a steering gear box 1. In the present embodiment, the yoke body 110 may be formed in a cylindrical shape and inserted into the housing 2 so as to support a rack bar 3. Furthermore, one side of the yoke body 110, facing the rack bar 3, may be formed in a concave shape.

A yoke slipper 111 may be installed in the concave part of the yoke body 110, and the yoke body 110 may be contacted with the rack bar 3 through the yoke slipper 111.

Furthermore, one or more yoke rings 113 may be pushed onto the outer surface of the yoke body 110, in order to prevent a rattle caused by tilting of the yoke body 110 at a gap between the housing 2 and the yoke body 110.

The elastic member 130 may be disposed at the other side (right side in FIG. 4) of the yoke body 110. The elastic member 130 may pressurize the yoke body 110 toward the rack bar 3 in a state where the elastic member 130 is fastened to the pressurizing unit 150.

The elastic member 130 may be formed with a plate-shaped spring, a plate-shaped spring or the like, and elastically pressurize the yoke body 110.

The elastic member 130 may additionally include a yoke spring to pressurize the yoke body 110 toward the rack bar 3, in addition to the plate-shaped spring.

The pressurizing unit 150 may be contacted with the elastic member 130 so as to elastically support the elastic member 130.

In the present embodiment, the pressurizing unit 150 may include a pusher 151 and a rotating elastic part 157.

The pusher 151 may be rotatably coupled to the yoke plug 171, and contacted with the elastic member 130 so as to support the elastic member 130. In the present embodiment, the pusher 151 may pressurize the elastic member 130 toward the yoke body 110 in a state where the pusher 151 is coupled to the yoke plug 171 through a screw.

In the present embodiment, the pusher 151 may include a pusher plate 152, a pusher protrusion 153, and a pusher fixing part 154.

The pusher plate 152 may have a circular plate shape, and the elastic member 130 may be received on one surface (the left side in FIG. 4) of the pusher plate 152.

The pusher protrusion 153 may be formed to protrude from the pusher plate 152 to the left side in FIG. 4, and the elastic member 130, a clearance adjusting unit 180 and the like may be coupled to the pusher protrusion 153.

The pusher fixing part 154 may be formed to protrude from the pusher plate 152 to the right side in FIG. 4, and have a screw thread formed on the outer circumferential surface thereof so as to be rotatably coupled to the yoke plug 171.

Both ends of the rotation elastic part 157 may be fixed to a rotating elastic part pusher fixing part 156 of the pusher 151 and the yoke plug unit 170, respectively, so as to rotatably and elastically support the pusher 151. In the present embodiment, the rotating elastic unit 157 may be formed with a torsion spring.

Figure 5:
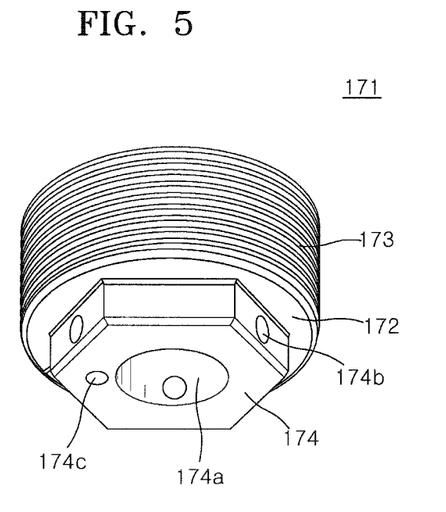
FIG. 5 is a diagram illustrating a yoke plug in the clearance compensator of the yoke in accordance with the embodiment of the present invention.
Figure 6:
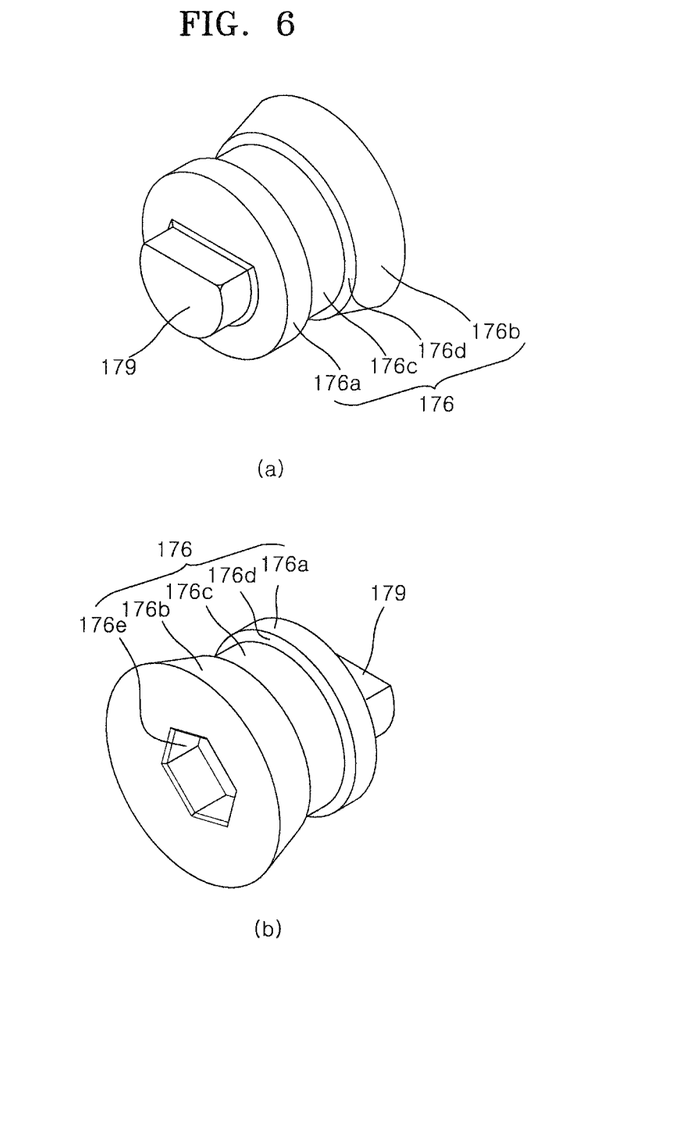
FIG. 6 is a perspective view of an adjusting part body and a rotating elastic part fixing part in accordance with the embodiment of the present invention.
Figure 7:
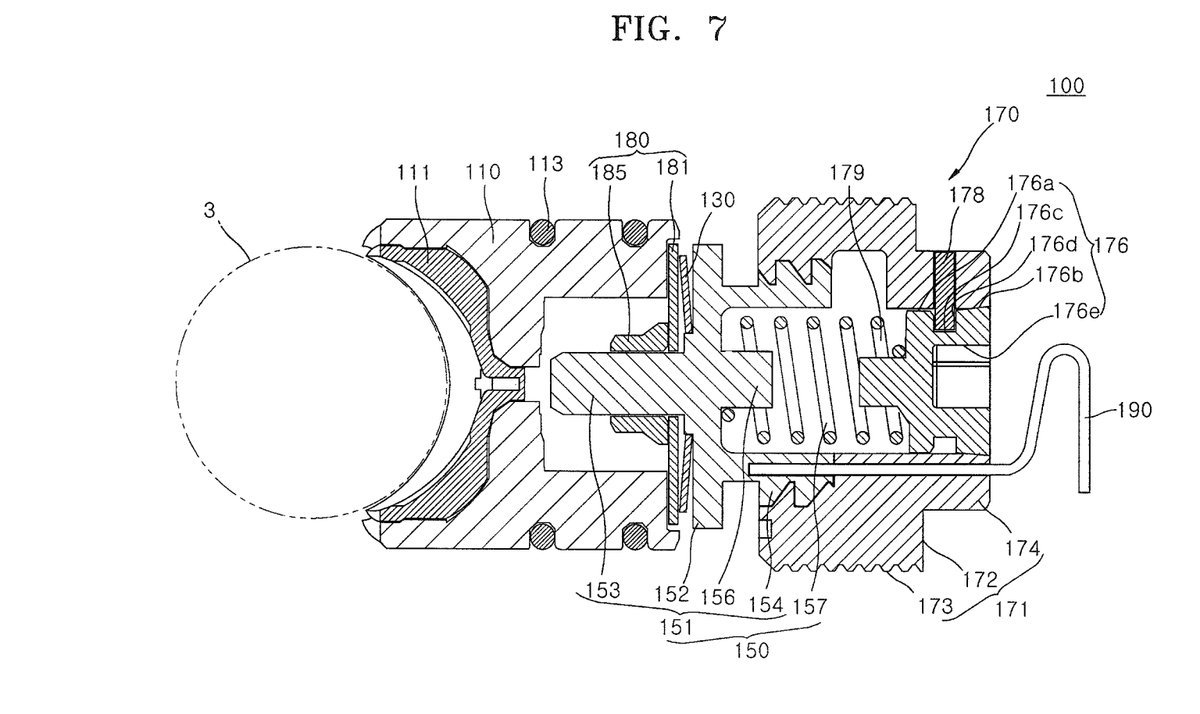
FIG. 7 is a cross-sectional view of the clearance compensator of the yoke in accordance with the embodiment of the present invention.
Figure 8:
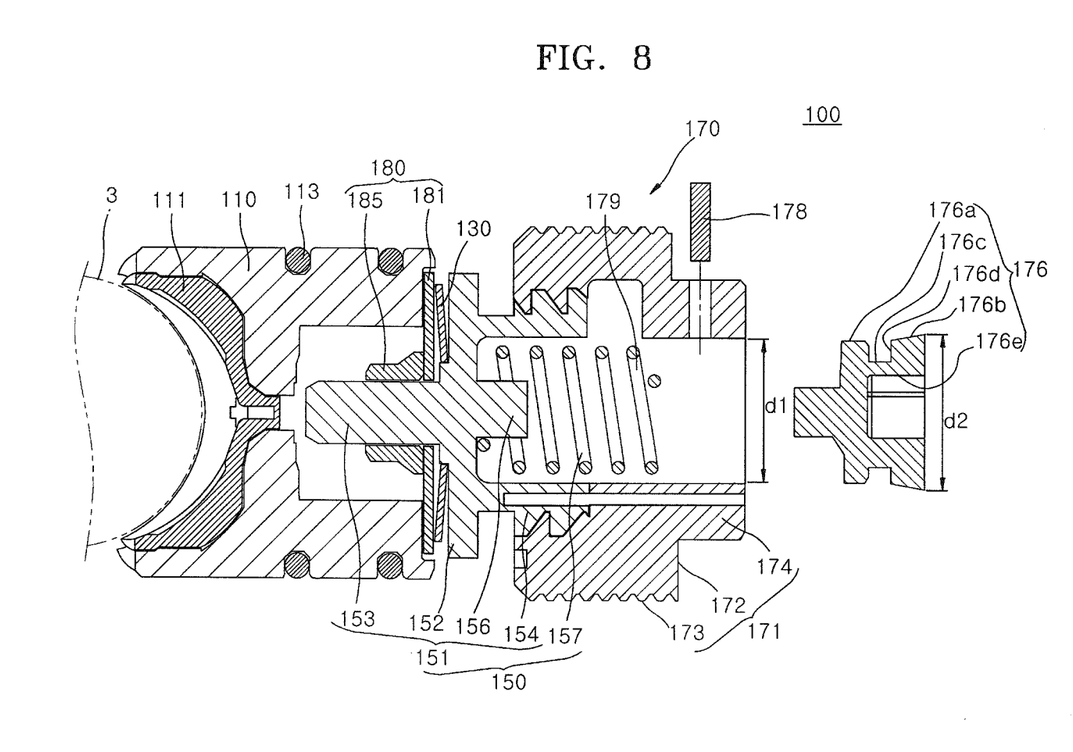
FIG. 8 is a cross-sectional view illustrating a state before an adjusting part body part and a body fixing part are assembled in the clearance compensator of the yoke in accordance with the embodiment of the present invention.

FIG. 5 is a diagram illustrating the yoke plug in the clearance compensator of the yoke in accordance with the embodiment of the present invention. FIG. 6 is a perspective view of an adjusting part body and a rotating elastic part fixing part in accordance with the embodiment of the present invention. FIG. 7 is a cross-sectional view of the clearance compensator of the yoke in accordance with the embodiment of the present invention. FIG. 8 is a cross-sectional view illustrating a state before an adjusting part body part and a body fixing part are assembled in the clearance compensator of the yoke in accordance with the embodiment of the present invention.

Referring to FIGS. 5 to 8, the yoke plug unit 170 may be fixed to the housing 2, and adjust the extent to which the pressurizing unit 150 elastically supports the elastic member 130. In the present embodiment, the yoke plug unit 170 may include a yoke plug 171 and a pressurization adjusting part 175.

The yoke plug 171 may be fixed to the housing 2, and the pressurization adjusting part 175 may be inserted into the yoke plug 171. In the present embodiment, the yoke plug 171 may include a yoke plug body 172, a yoke plug fixing part 173, and a yoke plug protrusion 174.

The yoke plug body 172 forming the exterior of the yoke plug 171 may be inserted into the housing 2. The yoke plug fixing part 173 may be formed in a screw thread shape on the outer circumferential surface of the yoke plug body 172, and fix the yoke plug body 172 to the housing 2. The yoke plug protrusion 174 may be formed to protrude toward the rear side (right side in FIG. 4) of the yoke plug body 172, and the body fixing part 178 and the like may be inserted into the yoke plug protrusion 174.

In the present embodiment, the yoke plug protrusion 174 may have a cross-section formed in a polygonal shape such that the yoke plug body 172 is easily coupled to the housing 4 through a tool such as a spanner. The yoke plug protrusion 174 may include an adjusting part entry hole 174a, a body fixing part entry hole 174b, and a fixing part entry hole 174c.

The adjusting part entry hole 174a may be formed in the left and right direction (based on FIG. 4) through the yoke plug body 172 such that the pressurization adjusting part 175 is inserted into the adjusting part entry hole 174a.

The body fixing part entry hole 174b may be formed in the yoke plug protrusion 174 from the outside of the yoke plug protrusion 174 toward the central axis of rotation of the yoke plug body 172, and the body fixing part 178 for pressurizing and fixing the adjusting part body part 176 inserted into the adjusting part entry hole 174a may be inserted into the body fixing part 178.

At this time, a plurality of body fixing part entry holes 174b may be formed along the outside of the yoke plug protrusion 174, and a plurality of body fixing parts 178 for pressurizing and supporting the adjusting part body part 176 may be inserted into the respective body fixing part entry holes 174b, thereby reliably fixing the adjusting part body part 176.

The fixing part entry hole 174c may correspond to a hole into which a fixing unit 190 for preventing the rotation of the pusher 151 through the rotating elastic part 157 is inserted, when the clearance compensator 100 of the yoke is inserted into the housing 2.

The pressurization adjusting part 175 may adjust the extent to which the pressurizing unit 150 supports the elastic member 130, and inserted and coupled to the adjusting part entry hole 174a.

In the present embodiment, the pressurization adjusting part 175 may include the adjusting part body part 176 and a rotating elastic part fixing part 179.

The adjusting part body part 176 may be inserted and coupled to the adjusting part entry hole 174a. In the present embodiment, the adjusting part body part 176 may include an adjusting part body 176a and an insertion coupling part 176b.

The adjusting part body 176a may be rotatably inserted into the adjusting part entry hole 174a, and have a cylindrical shape. When the adjusting part body 176a is rotated in a state where the adjusting part body 176a is inserted into the adjusting part entry hole 174a, the rotating elastic part fixing part 179 may be rotated. Then, the rotating elastic part 157 may be rotated to change an elastic force for pressurizing the pusher 151 toward the rack bar 3.

The insertion coupling part 176b may be positioned at the rear side (right side in FIG. 8) of the adjusting part body 176a. Furthermore, the insertion coupling part 176b may be formed to have a diameter which decreases toward the rack bar 3, and inserted and coupled to the adjusting part entry hole 174a.

In the present embodiment, the insertion coupling part 176b may be formed in such a manner that the diameter $d_2$ of the rear end part thereof (right end part in FIG. 8) is larger than the diameter $d_1$ of the adjusting part entry hole 174a. When the insertion coupling part 176b is pressed into the adjusting part entry hole 174a, the insertion coupling part 176b may be inserted and coupled to the adjusting part entry hole 174a, while the shape of the insertion coupling part 176b is changed.

In the present embodiment, the pressurization adjusting part 175 may further include the body fixing part 178. The body fixing part 178 may fix the adjusting part body part 176 to the yoke plug 171 so as to prevent the adjusting part body part 176 from coming off from the yoke plug 171.

In the present embodiment, the body fixing part 178 may fix the adjusting part body part 176 to the yoke plug 171 by pressurizing the adjusting part body part 176 while entering the body fixing part entry hole 174b. The body fixing part 178 may be formed of a metallic material and have a pin shape.

Since the body fixing part 178 is formed of a metallic material, it is possible to prevent damage caused by a load which is generated when the body fixing part 178 pressurizes and supports the adjusting part body part 176.

Furthermore, when the body fixing part 178 is formed in a pin shape, the body fixing part 178 may be easily inserted through the body fixing part entry hole 174b, and simply assembled into the body fixing part entry hole 174b through an insertion and coupling method, without using a tool such as a driver.

In order to prevent the adjusting part body part 176 from sliding on the body fixing part 178 in a state where the body fixing part 178 pressurizes the adjusting part body part 176, a body fixing part receiving part 176c may be concavely formed on the side surface of the adjusting part body part 176 so as to receive the body fixing part 178.

The body fixing part receiving part 176c may be concavely formed between the adjusting part body 176a and the insertion coupling part 176b, and an end part of the body fixing part 178 may be received on the body fixing part receiving part 176c. Since the body fixing part receiving part 176c is concavely formed between the adjusting part body 176a and the insertion coupling part 176b, a body fixing part locking part 176d may be formed in a stepped shape between the body fixing part receiving part 176c and the adjusting part body 176a and the insertion coupling part 176b.

Thus, when the body fixing part 178 is contacted with the body fixing part receiving part 176c so as to pressurize the adjusting part body part 176, the end part of the body fixing part 178 may be locked to the body fixing part locking part 176d so as to prevent the movement of the adjusting part body part 176.

The rotating elastic part fixing part 179 may be formed to protrude from the adjusting part body part 176 toward the rack bar 3 so as to fix the rotating elastic part 157. In the present embodiment, the rotating elastic part fixing part 179 may be integrated with the adjusting part body part 176, and the rotating elastic part 157 may be fitted to the outside of the rotating elastic part fixing part 179. Thus, the rotating elastic part 157 may be rotated through the rotation of the adjusting part body part 176, in order to adjust the rotational elasticity of the rotating elastic part 157.

In the present embodiment, the clearance compensator 100 of the yoke may further include the clearance adjusting unit 180. The clearance adjusting unit 180 may include a cover part 181 and a fastening part 185.

The cover part 181 may be disposed between the yoke body 110 and the elastic member 130, and contacted with the yoke body 110 and the elastic body 130 so as to adjust a clearance inside the clearance compensator 100 of the yoke.

The fastening part 185 may be coupled to the pressurizing unit 150 so as to pressurize the cover part 181 toward the elastic member 130. In the present embodiment, the fastening part 185 may include a nut or the like.

In the present embodiment, the clearance compensator 100 of the yoke may further include a fixing unit 190.

The fixing unit 190 may be received on the pusher 151 through the yoke plug 171 so as to maintain the screw coupling between the pusher 151 and the yoke plug 171. When the pressurizing unit 150 is assembled into the housing 2 in a state where the pressurizing unit 150 is coupled to the yoke plug 171, the pusher 151 may receive a rotational force through the rotating elastic part 157. Thus, the screw coupling between the pusher 151 and the yoke plug 171 may be released.

At this time, since one end part (left end part in FIG. 4) of the fixing unit 190 is received on the pusher 151 through the fixing part entry hole 174c, the screw coupling between the pusher 151 and the yoke plug 171 may be prevented from being released.

The other end part (right end part in FIG. 4) of the fixing unit 190 may be exposed to the outside of the yoke plug 171 when the one end part is received on the pusher 151. Through this structure, an operator may easily remove the fixing unit 190 after the clearance separator 100 of the yoke is assembled into the steering gear box 1.

Hereafter, the operation principle of the clearance compensator 100 of the yoke in accordance with the embodiment of the present invention will be described.

Referring to FIGS. 1, 4, 7, and 8, the yoke body 110 which is elastically supported by the elastic member 130 in the clearance compensator 100 of the yoke may pressurize the rack bar 3 to the left side in FIG. 1.

When the gears between the rack bar 3 and the pinion 4 is worn out by operation of the vehicle, the rack bar 3 may be moved from the initial position to the left side in FIG. 1 due to the wear of the gears. At this time, since the yoke body 110 is elastically supported by the elastic member 130, the yoke body 110 may be moved to the left side by a distance corresponding to the movement of the rack bar 3 to the left side. That is, the clearance caused by the movement of the rack bar 3 may be compensated for through the movement of the yoke body 110 by the elastic member 130.

The pusher 151 receives a rotational elastic force through the rotating elastic part 157. Thus, when the yoke body 110 is moved to the left side in FIG. 7, the pusher 151 may be moved to the left side while the screw coupling between the pusher 151 and the yoke plug 171 is released by the rotating elastic part 157. That is, since the elastic member 130 supported by the pusher 151 is moved to the left side as the pusher 151 is moved to the left side, the elastic member 130 may still elastically support the yoke body 110.

In order to adjust the extent to which the yoke body 110 pressurizes the rack bar 3 in a state where the clearance compensator 100 of the yoke is assembled, the pressurization adjusting part 175 may be used.

After the body fixing part 178 for fixing the adjusting part body part 176 to the yoke plug 171 is detached, a tool insertion groove 176e formed in the rear end surface of the adjusting part body part 176 may be rotated through a hexagonal wrench or the like. Then, the adjusting part body part 176 and the rotating elastic part fixing part 179 may be rotated together. Thus, the rotating elastic part 157 fixed to the rotating elastic part fixing part 179 may be rotated to adjust the extent to which the elastic member 130 or the yoke body 110 is pressurized through the pusher 151.

When the adjustment through the rotation of the rotating elastic part 157 is completed, the adjusting part body part 176 may be pressurized toward the rack bar 3 and pressed into the adjusting part entry hole 174a. After the adjusting part body part 176 is pressed into the adjusting part entry hole 174a, the body fixing part 178 may be inserted into the body fixing part entry hole 174b such that the end part of the body fixing part 178 pressurizes the body fixing part receiving part 176c, thereby preventing the adjusting part body part 176 from coming off from the yoke plug 171.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A clearance compensator for a yoke, comprising:
a yoke body having a cavity and configured to support a rack bar;
a pusher assembly comprising a pusher, a yoke plug and a torsion spring placed inside a bore of the yoke plug, wherein the torsion spring is connected to the pusher and configured to cause the pusher to rotate about an axis relative to the yoke plug, wherein the pusher is engaged with the yoke plug such that the pusher moves along the axis relative to the yoke plug as it rotates about the axis, the pusher comprising a central protrusion and a pusher plate portion integrated with the central protrusion; and
a plate spring comprising a first main surface and a second main surface, the plate spring further comprising a central through-hole, a radially inner portion around the central through-hole, and a radially outer portion around the radially inner portion with reference to the axis,
wherein the yoke body, the plate spring and the pusher assembly are arranged in order along the axis such:
that the plate spring is interposed between the yoke body and the pusher plate portion of the pusher,
that the central protrusion of the pusher passes through the central through-hole of the plate spring and enters into the cavity of the yoke body,
that the first main surface of the plate spring faces the yoke body and the second main surface of the plate spring faces the yoke plug,
that the pusher contacts the radially inner portion of the plate spring on its second main surface while the pusher and the radially outer portion of the plate spring do not contact each other and have a gap therebetween,
wherein the clearance compensator is configured such that the torsion spring causes the pusher to rotate about the axis relative to the yoke plug and to move toward the yoke body along the axis, which causes the pusher to push the radially inner portion of the plate spring on the second main surface such that the plate spring exerts force to the yoke body along the axis for the yoke body to transmit the force to the rack bar.

2. The clearance compensator of claim 1, further comprising a torsion adjustment member coupled to one end of the torsion spring and rotatably engaged with the yoke plug wherein the torsion adjustment member is configured to rotate relative to the yoke plug for adjusting torsion of the torsion spring applied to the pusher.

3. The clearance compensator of claim 2, further comprising a body fixing member configured to fix the torsion adjustment member to the yoke plug.

4. The clearance compensator of claim 3, wherein the body fixing member is inserted into a hole formed in the yoke plug, and configured to push the torsion adjustment member to the yoke plug.

5. The clearance compensator of claim 4, wherein the body fixing member is formed of a metallic material, and has a pin shape.

6. The clearance compensator of claim 1, further comprising a fixing member comprising a bar extending through a hole of the yoke plug and a hole of the pusher to inhibit the pusher from rotating about the axis relative to the yoke plug.

7. The clearance compensator of claim 6, wherein one end of the fixing member is received in the hole of the pusher and the other end of the fixing member is exposed outside the hole of the yoke plug.

8. The clearance compensator of claim 1, further comprising a clearance adjusting unit including a cover portion disposed between the yoke body and the plate spring and contacting with the yoke body and the plate spring, and a fastening portion coupled to the pusher to push the cover portion toward the plate spring.

\* \* \* \* \*